United States Patent
Basavaraj et al.

(10) Patent No.: US 11,283,637 B2
(45) Date of Patent: Mar. 22, 2022

(54) MULTICAST ROUTING IN A LOGICAL ROUTER HAVING SEPARATED NORTH/SOUTH AND EAST/WEST PACKET HANDLERS

(71) Applicant: VMware, Inc., Palo Alto, CA (US)

(72) Inventors: Vijayalaxmi Basavaraj, San Jose, CA (US); Ankur Dubey, San Jose, CA (US); Sami Boutros, Union City, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/842,383

(22) Filed: Apr. 7, 2020

(65) Prior Publication Data

US 2021/0314182 A1    Oct. 7, 2021

(51) Int. Cl.
*H04L 12/28*    (2006.01)
*H04L 12/18*    (2006.01)
*H04L 45/44*    (2022.01)

(52) U.S. Cl.
CPC .............. *H04L 12/18* (2013.01); *H04L 45/44* (2013.01)

(58) Field of Classification Search
CPC . H04L 12/18; H04L 45/44; H04L 2/28; H04L 45/16
See application file for complete search history.

(56) References Cited

U.S. PATENT DOCUMENTS

| | | | |
|---|---|---|---|
| 10,181,958 B1* | 1/2019 | Rainovic | H04L 12/2889 |
| 2008/0205397 A1* | 8/2008 | Xu | H04L 45/00 370/390 |
| 2009/0010257 A1* | 1/2009 | Chaudhry | H04L 45/28 370/390 |
| 2010/0135294 A1* | 6/2010 | Asati | H04L 45/16 370/390 |
| 2010/0260178 A1* | 10/2010 | Huang | H04L 45/16 370/390 |
| 2017/0163536 A1* | 6/2017 | Shen | H04L 47/125 |
| 2019/0020568 A1* | 1/2019 | Kommula | H04L 41/12 |

* cited by examiner

*Primary Examiner* — Abdelnabi O Musa

(57) ABSTRACT

The technology disclosed herein enables multicast network traffic to pass an RPF check in a logical router having separated packet handlers. In a particular embodiment, a method includes, in a north/south packet handler of a first logical router, receiving first network traffic from an east/west packet handler of the logical router. The first network traffic is multicast network traffic and the logical router is a first hop router for the first network traffic from a source of the first network traffic. The method further includes identifying an entry for the source in unicast routing information for unicast network traffic. Identifying the entry indicates that the first network traffic passes a reverse path forwarding (RPF) check. In response to the first network traffic passing the RPF check, the method includes transferring the first network traffic from the north/south packet handler to a next hop for the first network traffic indicated by first multicast routing information.

20 Claims, 7 Drawing Sheets

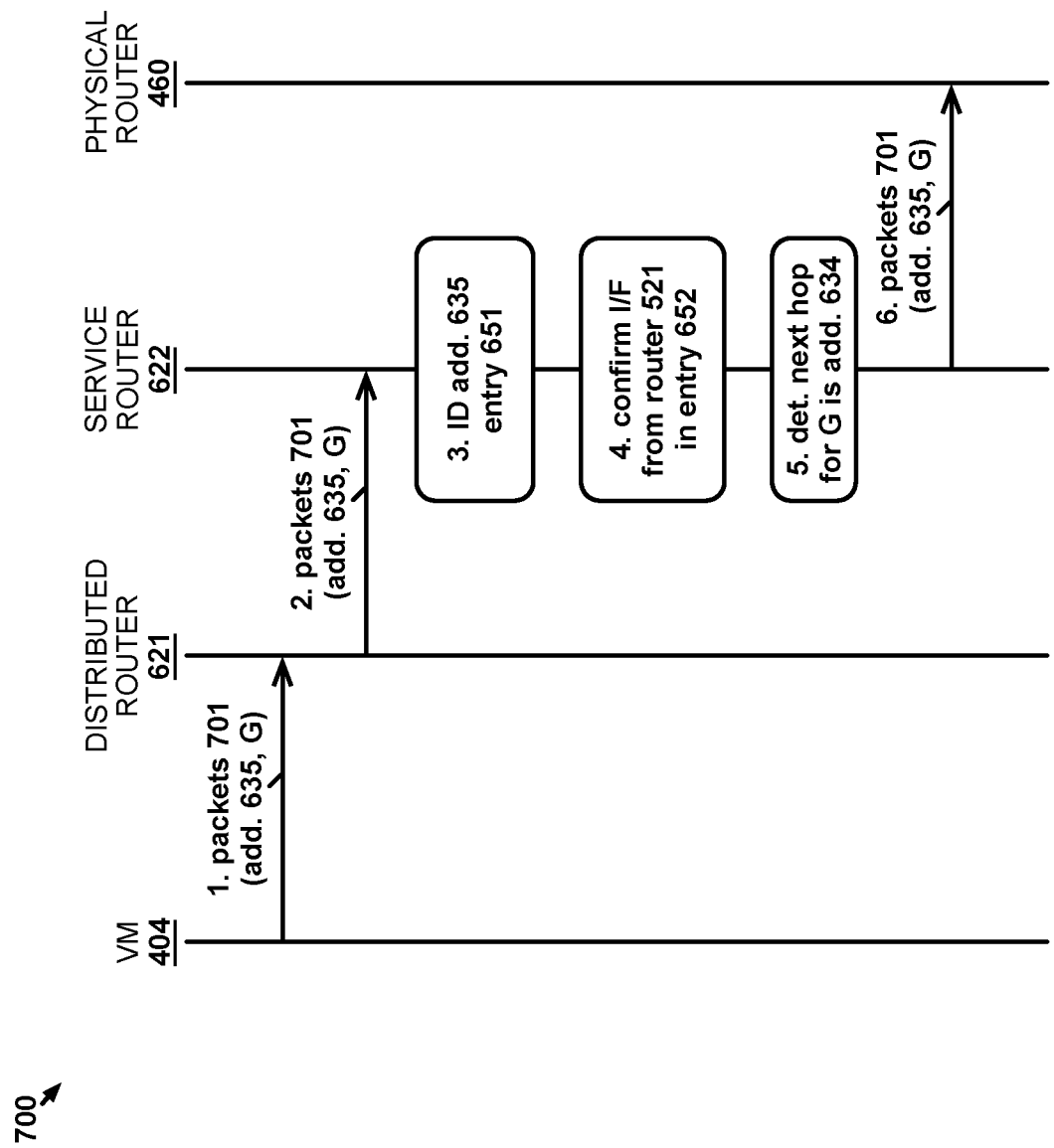

MULTICAST ROUTING IN A LOGICAL ROUTER HAVING SEPARATED NORTH/SOUTH AND EAST/WEST PACKET HANDLERS

TECHNICAL BACKGROUND

Multicast routing of packets allows packets to be directed to a group of destinations. For example, a multicast packet may be directed to a multicast destination address that represents a group of device addresses to which the packet should be routed. In contrast, unicast packet would instead be directed to a single device address. Since a multicast packet by definition will traverse multiple paths to the multiple destinations, it is possible that one of those paths will loop back to a first-hop logical router handling the multicast packet after transfer from the packet's source. To prevent such loops, a multicast routing protocol, such as one of the Protocol-Independent Multicast (PIM) family of protocols, may direct a first-hop logical router to perform a reverse path forwarding (RPF) check on the multicast packet. The RPF check determines whether the router received the multicast packet on an interface that is associated with the next hop for a hypothetical unicast packet directed from the first-hop logical router back to the source. If the unicast packet's next hop is over the interface from where the multicast packet was received, then there is no loop and the multicast packet is routed to its next hop. Otherwise, the multicast packet is discarded to avoid continuing the loop.

SUMMARY

The technology disclosed herein enables multicast network traffic to pass an RPF check in a logical router having separated packet handlers. In a particular embodiment, a method includes, in a north/south packet handler of a first logical router, receiving first network traffic from an east/west packet handler of the logical router. The first network traffic is multicast network traffic and the logical router is a first hop router for the first network traffic from a source of the first network traffic. The method further includes identifying an entry for the source in unicast routing information for unicast network traffic. Identifying the entry indicates that the first network traffic passes a reverse path forwarding (RPF) check. In response to the first network traffic passing the RPF check, the method includes transferring the first network traffic from the north/south packet handler to a next hop for the first network traffic indicated by first multicast routing information.

In some embodiments, the first multicast routing information indicates that multicast network traffic from the source should be received over an interface with the east/west packet handler. In those embodiments, the method includes, before transferring the first network traffic, determining that the first network traffic was received by the north/south packet handler from the east/west packet handler in accordance with the first multicast routing information.

In some embodiments, the method includes, in the north/south packet handler, receiving second network traffic directed to the source. The second network traffic is unicast network traffic. The method also includes passing the second network traffic to the east/west packet handler, wherein the east/west packet handler routes the second network traffic to the source based on the unicast routing information.

In some embodiments, the unicast routing information and the first multicast routing information are used in a virtual routing and forwarding (VRF) instance on the north/south packet handler.

In some embodiments, the method includes, in the east/west packet handler, receiving the first network traffic from the source.

In some embodiments, the method includes transferring the first network traffic from the east/west packet handler to the north/south packet handler based on second multicast routing information that indicates that multicast network traffic from the source should be received over an interface with the source.

In some embodiments, a Protocol-Independent Multicast (PIM) protocol is used for the first network traffic.

In some embodiments, the source comprises a virtual machine.

In some embodiments, the east/west packet handler comprises a distributed router and the north/south packet handler comprises a service router.

In another embodiment, an apparatus is provided having one or more computer readable storage media and a processing system operatively coupled with the one or more computer readable storage media. Program instructions stored on the one or more computer readable storage media, when read and executed by the processing system, direct the processing system to implement a north/south packet handler of the first logical router and, in the north/south packet handler, receive first network traffic from an east/west packet handler of the logical router. The first network traffic is multicast network traffic and the logical router is a first hop router for the first network traffic from a source of the first network traffic. The program instructions further direct the processing system to identify an entry for the source in unicast routing information for unicast network traffic. Identification of the entry indicates that the first network traffic passes a reverse path forwarding (RPF) check. In response to the first network traffic passing the RPF check, the program instructions direct the processing system to transfer the first network traffic from the north/south packet handler to a next hop for the first network traffic indicated by first multicast routing information.

BRIEF DESCRIPTION OF THE DRAWINGS

FIG. 7 illustrates another operational scenario for routing multicast packets in a logical router having separated packet handlers.

DETAILED DESCRIPTION

The logical routers described herein include two packet handlers that handle different aspects of packet routing and are connected by a backplane link. One packet handler handles east/west packet traffic for a network environment while the other packet handler handles north/south packet traffic into and out of the network environment. North/south packet traffic is passed between the north/south packet handler and the east/west packet handler over the backplane link. Despite having two packet handlers, a logical router herein is treated as a single element by other network systems and devices (e.g., routers, switches, endpoints, etc.) that are logically connected to the logical router. Since the logical router is treated as a single element, unicast routing information (e.g., routing and/or forwarding table) used by the logical router to route packets also treats the logical router as a single element. The unicast routing information has no record of the backplane link that transfers north/south packets between the two packet handlers in the logical router, which causes RPF checks on multicast packets to fail.

In particular, when the north/south packet handler receives an outbound multicast packet, the multicast packet is received over the backplane link from the east/west packet handler, which received the multicast packet from the source of the packet. When the north/south packet handler performs an RPF check on the multicast packet using the unicast routing information that the north/south packet handler uses to route inbound unicast packet traffic, the RPF check will fail because the unicast routing information does not indicate the backplane link over which the multicast packet was received. Instead the unicast routing information indicates the next hop from the logical router as a whole, which is the source of the multicast packet since the logical router is a first hop router from the source. Accordingly, the next hop indicated by unicast routing information will not match the east/west packet handler from which the multicast packet was received. To ensure the RPF check does not fail due to the backplane link between the east/west packet handler and the north/south packet handler of the logical router, the north/south packet handler uses an RPF check that ensures an entry for the source of multicast traffic exists in the unicast routing information and is not concerned with the next hop interface indicate by the unicast routing information.

Figure 1:
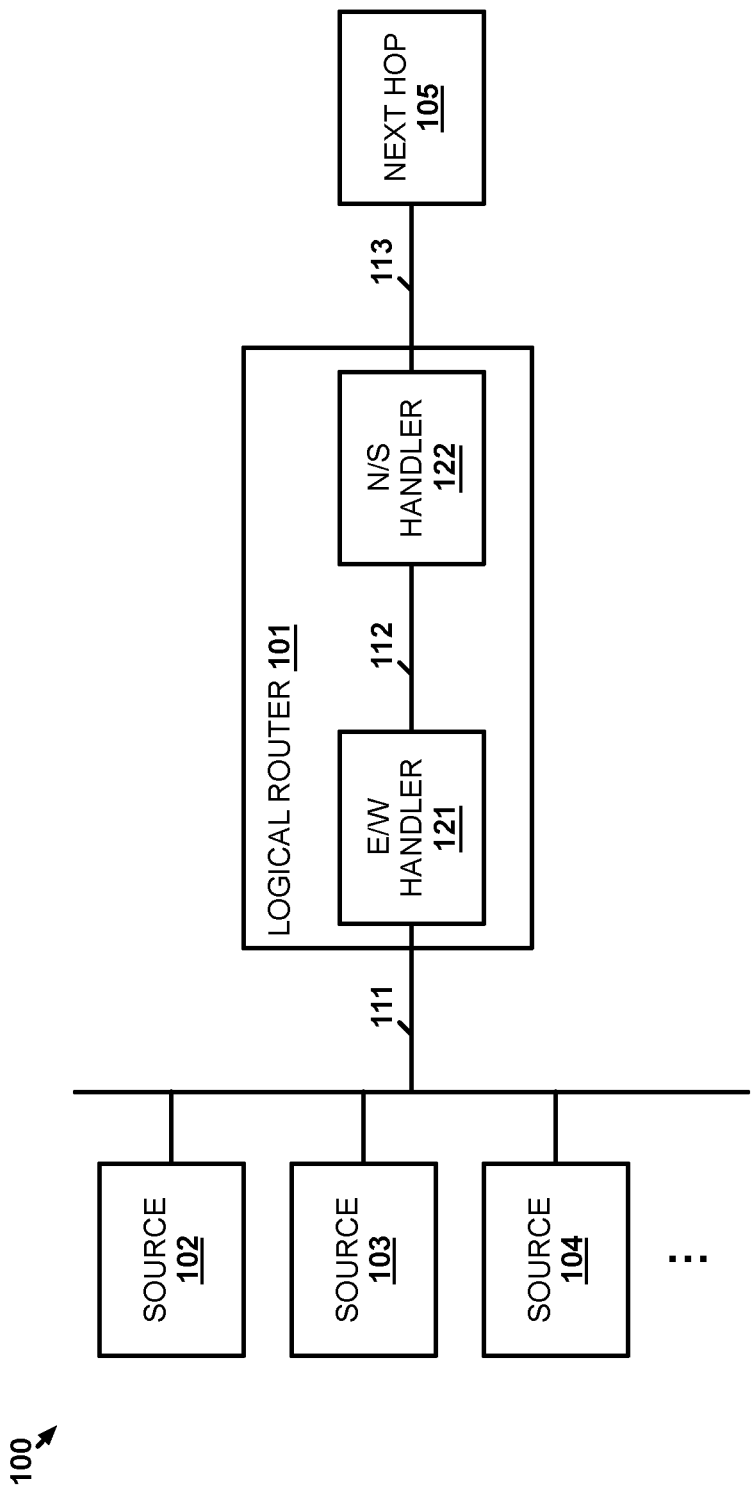
FIG. 1 illustrates an implementation for routing multicast packets in a logical router having separated packet handlers.

FIG. 1 illustrates implementation 100 for routing multicast packets in a logical router having separated packet handlers. Implementation 100 includes logical router 101, sources 102-104, and next hop 105. Logical router 101 includes east/west packet handler 121 and north/south packet handler 122. Sources 102-104 and logical router 101, specifically east/west packet handler 121, communicate over logical communication links 111. Next hop 105 and logical router 101, specifically north/south packet handler 122, communicated over logical communication link 113. Sources 102-104, east/west packet handler 121, north/south packet handler 122, and next hop 105 may be physical devices, virtualized devices on one or more physical host devices, or some combination thereof.

In operation, logical router 101 routes packet communications between sources 102-104. The packet communications between sources 102-104 are commonly referred to as east/west network traffic. While this example includes three sources, it should be understood that logical router 101 may support any number of one or more sources up to a number of sources supported by logical router 101. A source is any physical or virtualized computing system that is capable of creating packets to transfer over a logical network created by logical router 101. Logical router 101 also routes packet communications inbound to sources 102-104 through logical router 101 (e.g., packets inbound through logical router 101 from next hop 105) or outbound from sources 102-104 through logical router 101 (e.g., packets outbound through logical router 101 to next hop 105). The inbound and outbound packet communications are commonly referred to as north/south network traffic. Logical router 101 may be integrated into an edge services gateway device (not shown) which may be implemented as a virtual machine or physical computer and/or special-purpose hardware. Logical router 101 may comprise executable instructions stored on machine-readable memory for execution on one or more general purpose processing units. The edge services gateway device may provide a variety of services, such as DHCP, NAT, firewall, load balancing, intrusion detection, DNS, etc., in addition to Layer 3 routing provided by logical router 101.

Some logical routers handle both east/west packet traffic and north/south packet traffic with a single packet handler. Logical router 101 uses east/west packet handler 121 for east/west packet traffic and north/south packet handler 122 for north/south packet traffic. Network elements outside of logical router 101 (i.e., sources 102-104 and next hop 105 in this example) are unaware that logical router 101 has separated packet handling duties between east/west packet handler 121 and north/south packet handler 122 because communication packets are seamlessly passed between east/west packet handler 121 and north/south packet handler 122, as necessary, over backplane logical link 112. For example, when north/south packet handler 122 receives an inbound packet from next hop 105 directed to source 104, north/south packet handler 122 passes the inbound packet to east/west packet handler 121 over backplane logical link 112 so that east/west packet handler 121 can handle the routing of the inbound packet to source 104. Since the packets exchanged over backplane logical link 112 are still within logical router 101, traversing backplane logical link 112 is not considered a logical network hop and, therefore, is not reflected in the unicast routing information used to route packet communications to source 104. It should be noted that the architecture shown and described with respect to logical router 101 is somewhat abstracted from actual implementation details. For example, packets may not actually be exchanged as such between east/west packet handler 121 and north/south packet handler 122. Instead, to reduce unnecessary copying within a common machine that executes logical router 101, a pointer or descriptor indicating where in memory a packet is stored may be passed as a parameter between software routines that provide functionality of the packet handlers 121, 122. As it is common to describe such operations at a level of abstraction as described herein, such description should be construed as encompassing such implementation details.

Figure 2:
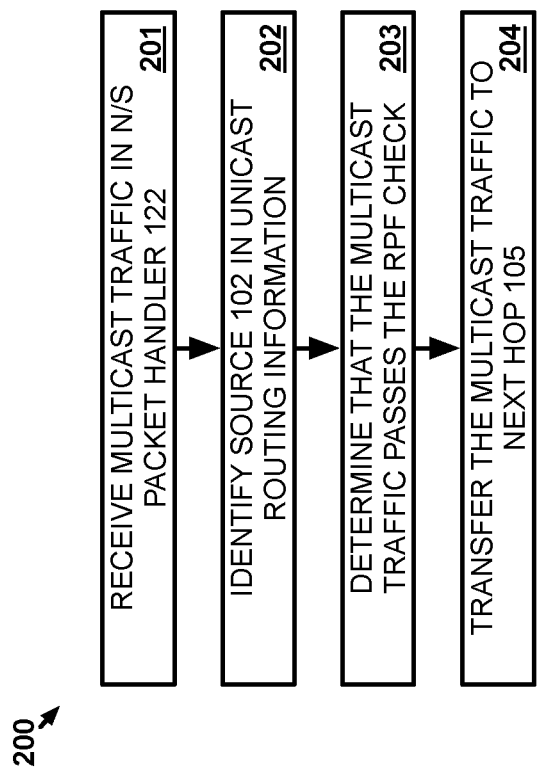
FIG. 2 illustrates an operational scenario to route multicast packets in a logical router having separated packet handlers.

FIG. 2 illustrates operational scenario 200 to route multicast packets in a logical router having separated packet handlers. In operational scenario 200, north/south packet handler 122 receives multicast network traffic from east/west packet handler 121 (201). In this example, the multicast network traffic includes one or more packets that are addressed to a multicast network address and that originated at source 102. The network addresses herein may be Internet Protocol (IP) addresses or may use another protocol for addressing. Logical router 101 is the first hop router for the multicast network traffic transferred from source 102. Since east/west packet handler 121 is the component of logical router 101 that faces source 102, source 102 transferred the multicast network traffic to east/west packet handler 121 as the first hop for the multicast network traffic. After east/west packet handler 121 received the multicast network traffic from source 102, east/west packet handler 121 transferred the multicast network traffic over backplane logical link 112 to north/south packet handler 122. East/west packet handler 121 may have referenced multicast routing information in east/west packet handler 121 to determine that the multicast network traffic should be transferred to north/south packet handler 122 for handling.

After receiving the multicast network traffic, north/south packet handler 122 identifies an entry for source 102 in unicast routing information for unicast network traffic used by north/south packet handler 122 to route inbound network traffic directed to one of sources 102-104 (202). The unicast routing information may be a routing table, forwarding table, or some other type of information that a router may reference to determine where network traffic should be sent. Normally, an RPF check would further include north/south packet handler 122 determining whether the entry indicates that east/west packet handler 121 is a next hop for unicast network traffic directed to source 102. East/west packet handler 121 being the next hop in that scenario would cause the multicast network traffic to pass the RPF check. However, as discussed above, the unicast network information does not indicate that east/west packet handler 121 is a next hop for inbound unicast network traffic directed to source 102. Instead, the entry indicates that source 102 is the next hop for unicast network traffic directed thereto because logical router 101 is first hop router for network traffic coming from source 102. A normal RPF check on the multicast network traffic would, therefore, fail and north/south packet handler 122 would drop the multicast network traffic.

In operational scenario 200, north/south packet handler 122 identifying the routing entry indicates that the first network traffic passes the RPF check performed by north/south packet handler 122's on the multicast network traffic (203). The RPF check in this example does not require that the entry indicate east/west packet handler 121 as being the next hop for unicast network traffic directed to source 102 because the entry would not provide that indication, as discussed above. If north/south packet handler 122 did not find an entry for source 102 in the unicast routing information, then the RPF check would fail and north/south packet handler 122 would discard the multicast network traffic.

In response to the multicast network traffic passing the RPF check, north/south packet handler 122 transfers the multicast network traffic to a next hop for the multicast network traffic indicated by multicast routing information (204). In this example, the multicast routing information indicates that next hop 105 is the next hop for the multicast network traffic from north/south packet handler 122. Next hop 105 may be another logical router, a gateway, or some other type of networking device.

In some examples, to further ensure that a loop is not occurring with the multicast network traffic, north/south packet handler 122 may reference the multicast routing information as part of its RPF check. In those examples, the multicast routing information includes an entry for source 102 that indicate an interface over which north/south packet handler 122 should expect to receive information from source 102. The entry in this case indicates that north/south packet handler 122 should receive multicast network traffic from source 102 over backplane logical link 112. Since north/south packet handler 122 did receive the multicast network traffic over backplane logical link 112 in this example, the actual interface (i.e., backplane logical link 112) matches the expected interface indicated by the multicast routing information.

Figure 3:
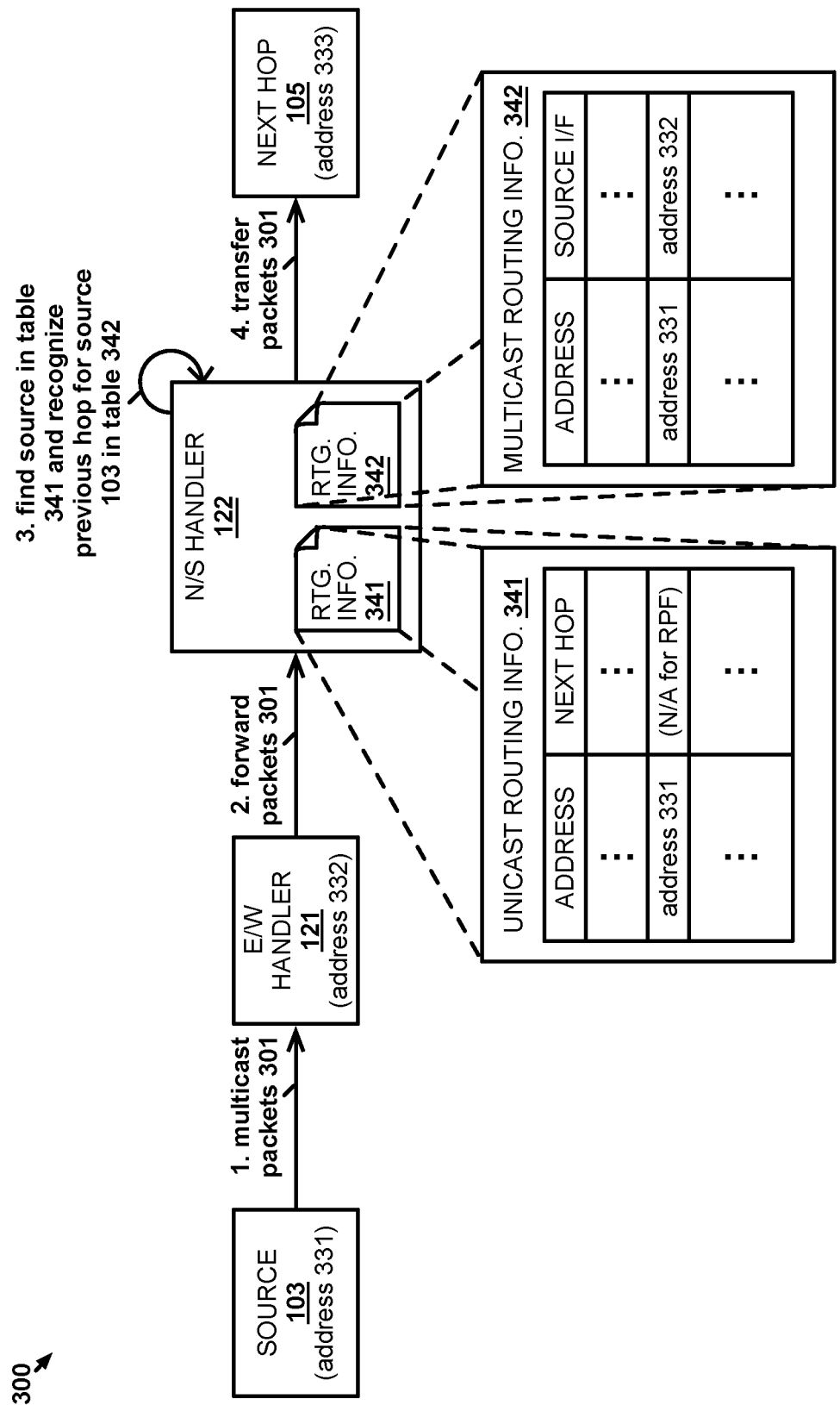
FIG. 3 illustrates an operational scenario for routing multicast packets in a logical router having separated packet handlers.

FIG. 3 illustrates operational scenario 300 for routing multicast packets in a logical router having separated packet handlers. Operational scenario 300 is an example where multicast packets 301 are transferred from source 103 at step 1 to east/west packet handler 121. When transferring multicast packets 301, source 103 may reference multicast routing information stored thereon to determine that east/west packet handler 121 is the first hop for multicast packets 301. Upon receiving multicast packets 301, east/west packet handler 121 recognizes that multicast packets 301 are not directed towards a multicast address served by east/west packet handler 121 and forwards multicast packets 301 to north/south packet handler 122 at step 2.

After receiving multicast packets 301, north/south packet handler 122 performs its RPF check on multicast packets 301 at step 3 to determine whether multicast packets 301 should be transferred to a next hop or dropped to stop looping. In particular, north/south packet handler 122 references unicast routing information 341 to determine whether an entry exists for source 103. In this example, multicast packets 301 identify their source based on the source's network address, which is network address 331 of source 103. Source 103 is, likewise, identified by its network address 331 in unicast routing information 341. As such, north/south packet handler 122 determines whether there is an entry corresponding to network address 331 in unicast routing information 341 during the RPF check. Since the entry does exist in unicast routing information 341, multicast packets 301 passes that portion of the RPF check. Unicast routing information 341 does include a next hop for inbound unicast packets directed to source 103 but that next hop is not relevant for purposes of multicast packets 301 passing the above portion of the RPF check.

Additionally, during the RPF check of multicast packets 301, north/south packet handler 122 references multicast routing information 342 to identify an entry therein corresponding to source 103 being the source of multicast packets 301. As with unicast routing information 341, source 103 is identified by network address 331 in multicast routing information 342. In this case, once north/south packet handler 122 has identified the entry for network address 341, north/south packet handler 122 identifies an interface from which multicast packets sent from source 103 should be received, which is the interface with network address 332 (i.e., the network address of east/west packet handler 121). The interface in other examples may be identified with different or additional information, such as a port number or hardware address. East/west packet handler 121 compares the interface listed in multicast routing information 342 to the interface on which multicast packets 301 were actually received to ensure they match. If the two interfaces match, then multicast packets 301 pass this second portion of the RPF check.

Upon multicast packets 301 passing both portions of the RPF check, north/south packet handler 122 transfers multicast packets 301 to next hop 105 at step 4. Though not shown, next hop 105 is listed in multicast routing information 342 as being the next hop for packets addressed to the multicast network address used by multicast packets 301 (e.g., an entry for the multicast address indicates network address 333 as the next hop). If either portion of the RPF check had failed, then north/south packet handler 122 would have dropped multicast packets 301 to avoid loops.

It should be understood that, while the examples herein refer to logical routers having multiple packet handling components therein, other types of networking systems/devices may similarly include components separated by a backplane link like backplane logical link 112. For example, a route server may have a data plane component that receives multicast network traffic and transfers the multicast network traffic over a backplane logical link to a control plane component. The control plane component may then use the RPF check of north/south packet handler 122 to account for the existence of the backplane link in the route server.

Figure 4:
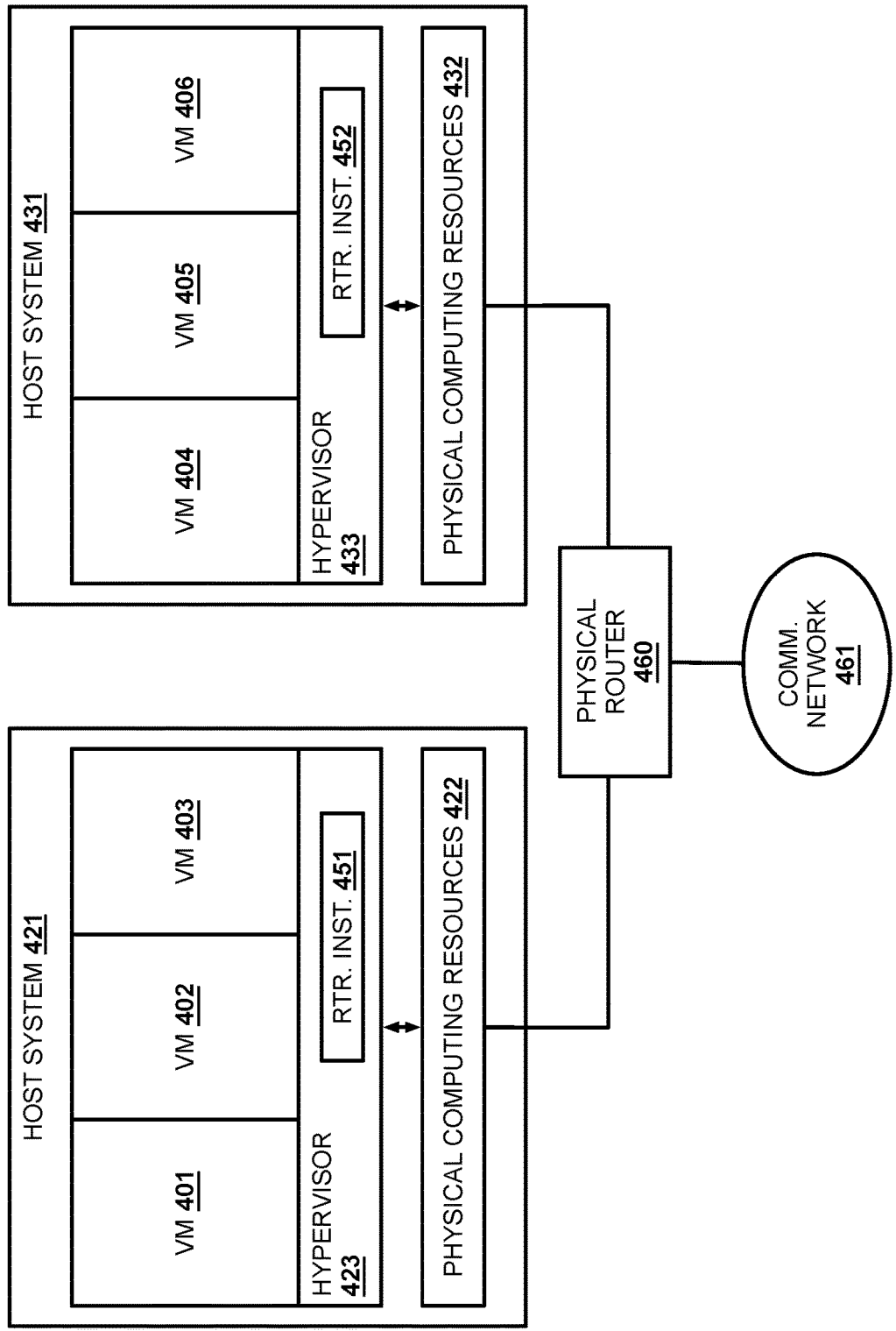
FIG. 4 illustrates another implementation for routing multicast packets in a logical router having separated packet handlers.

FIG. 4 illustrates implementation 400 for routing multicast packets in a logical router having separated packet handlers. Implementation 400 includes host computing systems 421 and 431, physical router 460, and communication network 461. Communication network 461 may include one or more local area networks (LANs) and/or wide area networks (WANs), such as the Internet, that exchange network traffic with physical router 460.

Host computing system 421 executes hypervisor 423 to allocate physical computing resources 422 among virtual machines 401-403. Likewise, host computing system 431 executes hypervisor 433 to allocate physical computing resources 432 among virtual machines 404-406. Physical computing resources 422 and 432 include processing resources (e.g., processing circuitry, such as Central Processing Unit(s) (CPUs) and/or Graphics Processing Unit(s) (GPUs), Application Specific Integrated Circuits (ASICs) etc.), memory resources including one or more computer readable storage media (e.g., random access memory, read only memory, hard disk drive(s), flash memory, etc. while in no examples would a storage medium of the memory resources be a propagated signal), network interface circuitry, user interfaces, or any other type of computing resource that a physical computing system may include.

Hypervisor 423 includes router instance 451 and hypervisor 433 includes router instance 452. Router instances 451 and 452 execute to form distributed router 621, which is an east/west router component of logical router 501 that creates a logical overlay network between virtual machines 401-405 and physical router 460, as discussed below with respect to FIGS. 5 and 6. The north/south component of logical router 501 is service router 622 implemented in virtual machine 406. Physical router 460 includes processing and communication circuitry for exchanging communications with communication network 461 and host computing systems 421 and 423. Physical router 460 acts as a gateway into the virtual computing environment created by virtual machines 401-405 and logical router 501.

It should be understood that the distribution virtual machines 401-406 evenly across two host computing systems, as shown in FIG. 4, is merely exemplary. Virtual machines 401-406 shown are representative of any number of virtual machines that may be implemented on any number of host computing systems.

Figure 5:
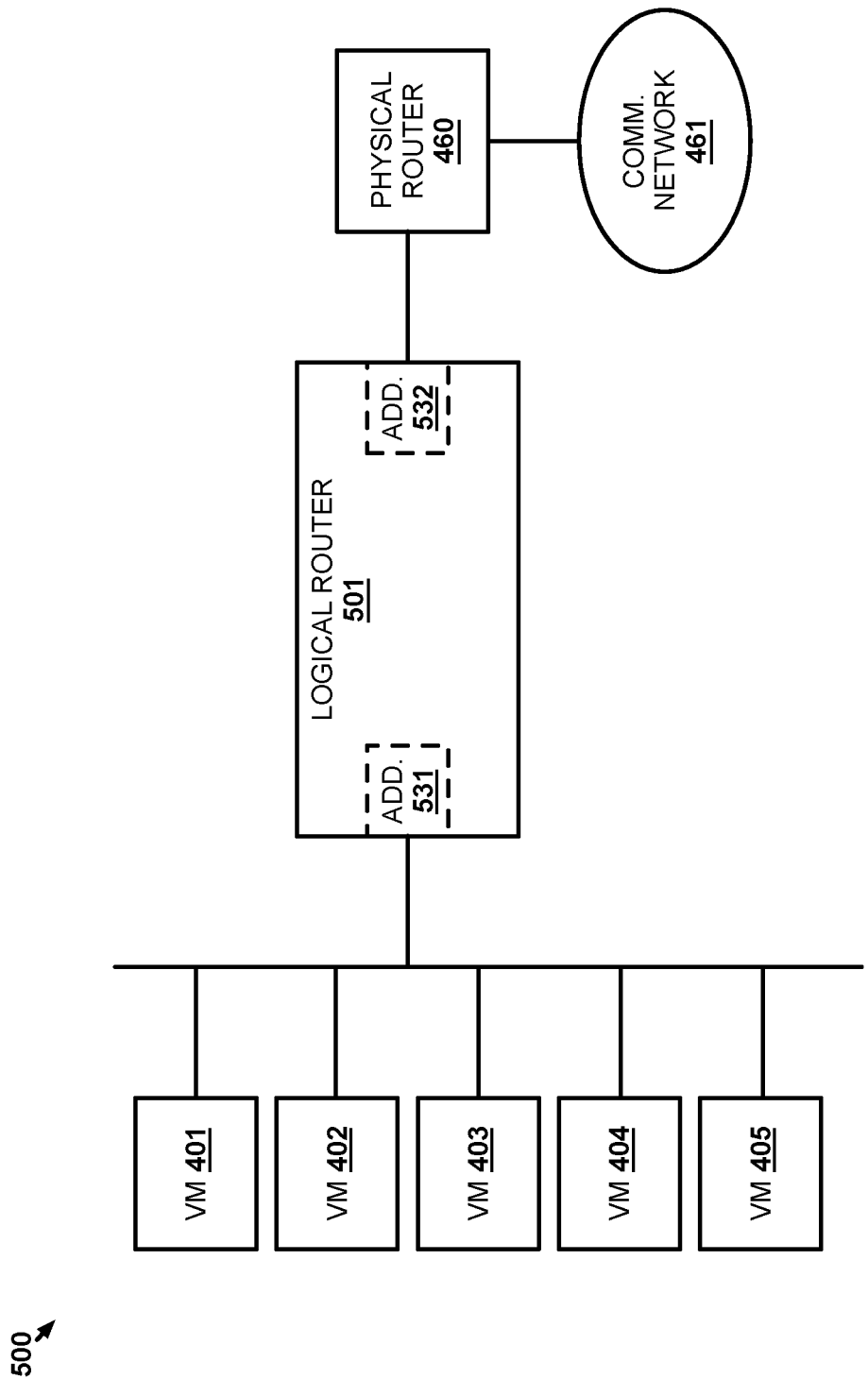
FIG. 5 illustrates a logical network for routing multicast packets in a logical router having separated packet handlers.

FIG. 5 illustrates logical network 500 for routing multicast packets in a logical router having separated packet handlers. Logical network 500 is a logical network, such as a software defined network or overlay network, which is defined by network addresses assigned to networked systems and devices, virtualized and/or physical. Network traffic is transferred between the networked systems and devices via the underlying physical structure (e.g., physical computing systems, routers, switches, links, etc.) based on the assigned network addresses. In particular, logical network 500 represents the logical communication connections between virtual machines 401-405, logical router 501, physical router 460, and communication network 461. As mentioned above, logical router 501 is actually made up of two packet handling components, distributed router 621 and service router 622, as detailed in FIG. 6. However, to networked elements outside of distributed router 621 and service router 622, the two components are treated as though they are a single routing element, which logical network 500 represents as logical router 501.

In operation, logical router 501 handles east/west network traffic from one or more of virtual machines 401-405 to others of virtual machines 401-405. The east/west network traffic travels into and out of logical router 501 via an interface using network address 531. Logical router 501 also handles north/south network traffic from one or more of virtual machines 401-405 to physical router 460 and from physical router 460 to one or more of virtual machines 401-405. The north/south network traffic between logical router 501 and physical router 460 is exchanged via an interface using network address 532. The north/south network traffic, like the east/west network traffic, is exchanged with virtual machines 401-405 via the interface using network address 531. If logical router 501 was implemented using a single packet handling component, then logical router 501 may use a typical RPF check when routing multicast traffic sourced from one of virtual machines 401-405. Instead, since logical router 501 is implemented as two separate components, the RPF check described below is used.

Figure 6:
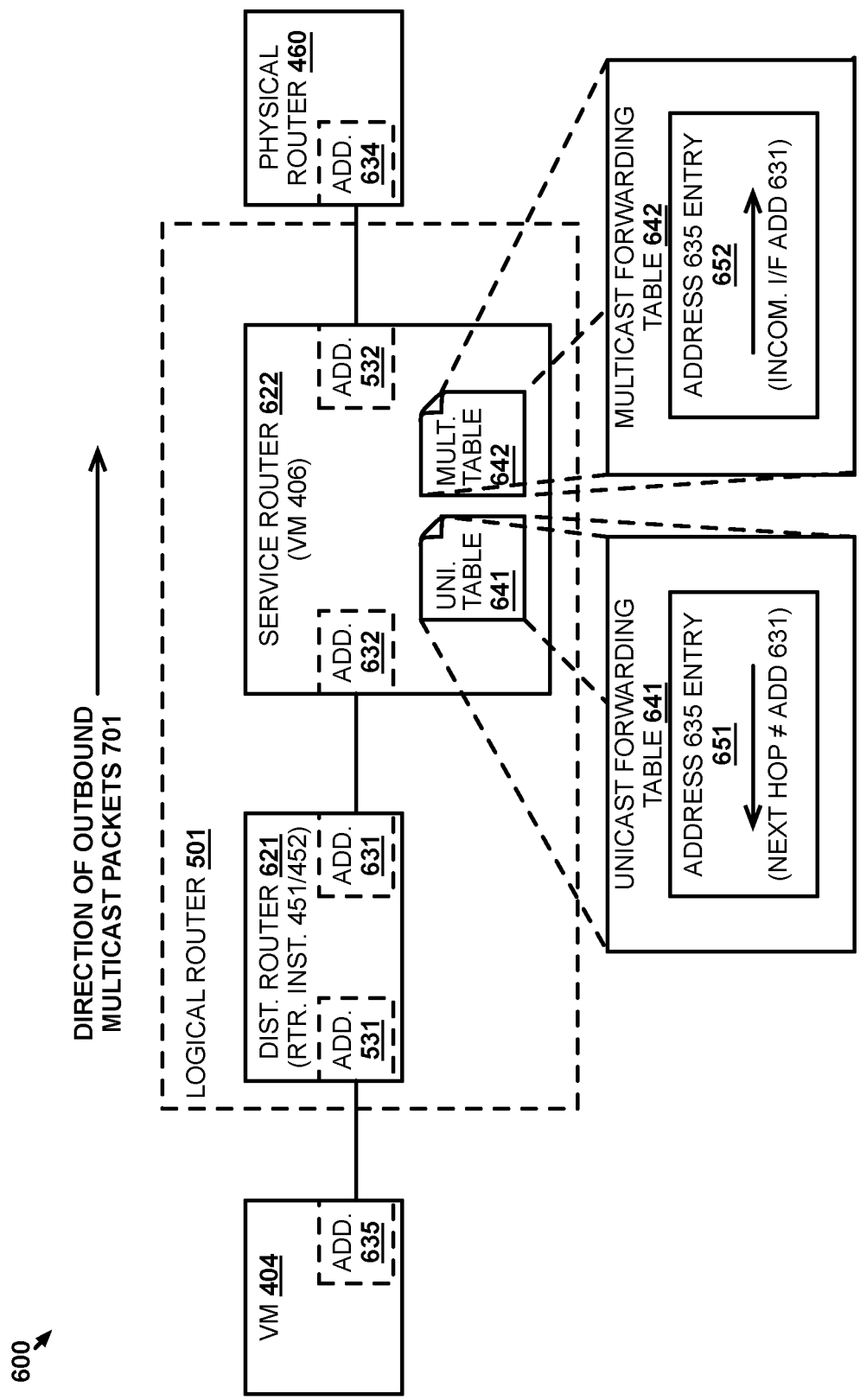
FIG. 6 illustrates another logical network for routing multicast packets in a logical router having separated packet handlers.

FIG. 6 illustrates logical network 600 for routing multicast packets in a logical router having separated packet handlers. Logical network 600 is a more detailed representation of logical network 500 that shows distributed router 621 and service router 622 as packet handling components of logical router 501. Logical network 600 also focuses on the elements of logical network 500 involved in the transfer of multicast packets 701 from virtual machine 404. Distributed router 621 handles east/west traffic between virtual machines 401-405 and, therefore, has the interface having network address 531 for logical router 501. Similarly, service router 622 handles the north/south network traffic exchanged with physical router 460 and, therefore, has the interface having network address 532 for logical router 501. Distributed router 621 and service router 622 exchange north/south network traffic over a backplane logical link between network address 631 and network address 632.

In this example, when multicast packets 701 are generated by virtual machine 404, multicast packets 701 are transferred to the first hop logical router, which is logical router 501 or, more specifically, distributed router 621. Multicast packets 701 are transferred over a logical link between network address 635 of virtual machine 404 and network address 531 of distributed router 621. Distributed router 621 then passes multicast packets 701 to service router 622, which will handle the transfer of multicast packets 701 out of the virtualized network environment to physical router 460. Multicast packets 701 are transferred out of the virtualized network environment over a logical link between network address 532 of service router 622 and network address 634 of physical router 460. Before transferring multicast packets 701, service router 622 performs the RPF check described in operational scenario 700 below using unicast forwarding table 641 and multicast forwarding table 642 to help ensure a loop not occurring. Though shown as the only forwarding tables used by service router 622, in some examples, unicast forwarding table 641 and multicast forwarding table 642 may be part of a virtual routing and forwarding (VRF) instance on service router 622 for routing multicast network traffic. The RPF check procedure may, therefore, be configured at the VRF instance level.

FIG. 7 illustrates operational scenario 700 for routing multicast packets in a logical router having separated packet handlers. In virtual machine 404, virtual machine 404 generates multicast packets 701 and transfers multicast packets 701 at step 1 to distributed router 621. Operational scenario 700 uses a common (S,G) path notation to indicate a multicast packet path for multicast packets 701. In (S,G) notation S is the network address of the source and G is the multicast group address to which the multicast packet is directed. In this example, the path is (address 635,G) since the source address of multicast packets 701 is network address 635 of virtual machine 404 while the multicast group address to which multicast packets 701 are directed is an address beyond physical router 460 and, therefore, is simply left as G.

Upon distributed router 621 receiving multicast packets 701, distributed router 621 determines that packets direct towards multicast address G should be handled by service router 622. Distributed router 621 may reference a forwarding table to determine that multicast packets 701 should be transferred to service router 622 or may simply determine that multicast address G is not a subnet handled by distributed router 621 and, therefore, should be handled by service router 622.

When service router 622 receives multicast packets 701 from distributed router 621, service router 622 performs an RPF check to determine whether multicast packets 701 are part of a loop. Specifically, service router 622 references unicast forwarding table 641 at step 3 to determine whether an entry for network address 631 (i.e., an entry for virtual machine 404, which is the source of multicast packets 701) exists in unicast forwarding table 641. Unicast forwarding table 641 at least indicates network addresses of the next hop for unicast network traffic directed to one or more of virtual machines 401-405. When referencing unicast forwarding table 641 in this example, unicast entry 651 is found for address 635 and multicast packets 701, therefore, passes one portion of the RPF check.

Unicast entry 651 does not indicate that unicast network traffic inbound to virtual machine 404 should be forwarded to network address 631 (i.e., distributed router 621) as the next hop. Rather, unicast entry 651 indicates the next hop from distributed router 621 for unicast network traffic directed to virtual machine 404. In this example, that next hop would be virtual machine 404 itself since there are no intervening hops between distributed router 621 and virtual machine 404. Unicast entry 651 indicates virtual machine 404 as the next hop because distributed router 621 also uses a copy of unicast forwarding table 641 to route unicast network traffic to virtual machine 404 and references unicast entry 651 to identify network address 635 as being the next hop for that traffic. Since unicast entry 651 indicates virtual machine 404 as being the next hop, multicast packets 701 would pass a traditional RPF check performed by distributed router 621 since the next hop matches the address from which multicast packets 701 were received by distributed router 621.

Rather than service router 622 relying on the mere existence of unicast entry 651 for multicast packets 701 to pass its RPF check, service router 622 further determines whether multicast packets 701 were received on an interface expected for multicast packets from virtual machine 404. To identify the expected interface, service router 622 references multicast forwarding table 642 at step 4 to identify multicast entry 652 for network address 635 therein. For this portion of the RPF check, service router 622 does not rely on the mere existence of multicast entry 652. Instead, multicast entry 652 indicates that multicast packets from virtual machine 404 should be received by service router 622 from the interface with network address 631 (i.e., should be received on the downlink to distributed router 621). Since multicast packets 701 were received on the interface with network address 631, service router 622 determines that multicast packets 701 are not looping and can be transferred to a next hop.

While it was mentioned above that distributed router 621 uses its own copy of unicast forwarding table 641 to route unicast network traffic inbound to virtual machines 401-405, distributed router 621 uses a different version of multicast forwarding table 642 when routing multicast network traffic from virtual machines 401-405. In particular, the multicast forwarding table used by distributed router 621 includes entries indicating that multicast network traffic should be received from the source of the multicast network traffic, as opposed to the interface with network address 631 indicated by multicast forwarding table 642. For example, when distributed router 621 determines that multicast packets 701 should be routed to service router 622, distributed router 621 finds an entry in its multicast forwarding table that indicates multicast packets received from virtual machine 404 should be received from network address 635 (i.e., should be received on the downlink to virtual machine 404). Since multicast packets 701 was received from virtual machine 404 and the multicast forwarding table indicates network address 634 as the next hop for multicast packets 701, distributed router 621 transfers multicast packets 701 to service router 622.

If multicast packets 701 did not pass either one of the checks in steps 3 and 4 above, the RPF check on multicast packets 701 would fail and multicast packets 701 would be discarded by service router 622. In some cases, the steps may be performed sequentially, with either step occurring first in the sequence, and failure to pass one step may result in the subsequent step not being performed. In this example, since multicast packets 701 passed both portions of the RPF check performed by service router 622, service router 622 references multicast forwarding table 642 at step 5 to identify an entry (not shown) indicating network address 634 of physical router 460 as the next hop for multicast packets directed to multicast address G. Service router 622 transfers multicast packets 701 to network address 634 accordingly.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method for multicast routing from a logical router, the method comprising:

in a north/south packet handler of the logical router, receiving first network traffic from an east/west packet handler of the logical router, wherein the first network traffic is multicast network traffic, and wherein the logical router is a first hop router for the first network traffic from a source of the first network traffic;

identifying an entry for the source in unicast routing information for unicast network traffic that is directed to the source from the east/west packet handler, wherein identifying the entry indicates that the first network traffic passes a reverse path forwarding (RPF) check; and in response to the first network traffic passing the RPF check, transferring the first network traffic from the north/south packet handler to a next hop for the first network traffic indicated by first multicast routing information.

2. The method of claim 1, wherein the first multicast routing information indicates that multicast network traffic from the source should be received over an interface with the east/west packet handler, and the method further comprising:

before transferring the first network traffic, determining that the first network traffic was received by the north/south packet handler from the east/west packet handler in accordance with the first multicast routing information.

3. The method of claim 1, further comprising:

in the north/south packet handler, receiving second network traffic directed to the source, wherein the second network traffic is unicast network traffic; and passing the second network traffic to the east/west packet handler, wherein the east/west packet handler routes the second network traffic to the source based on the unicast routing information.

4. The method of claim 1, wherein the unicast routing information and the first multicast routing information are used in a virtual routing and forwarding (VRF) instance on the north/south packet handler.

5. The method of claim 1, further comprising:

in the east/west packet handler, receiving the first network traffic from the source.

6. The method of claim 1, further comprising:

transferring the first network traffic from the east/west packet handler to the north/south packet handler based on second multicast routing information that indicates that multicast network traffic from the source should be received over an interface with the source.

7. The method of claim 1, wherein a Protocol-Independent Multicast (PIM) protocol is used for the first network traffic.

8. The method of claim 1, wherein the source comprises a virtual machine.

9. The method of claim 1, wherein the east/west packet handler comprises a distributed router and the north/south packet handler comprises a service router.

10. An apparatus for multicast routing from a logical router, the apparatus comprising:

one or more non-transitory computer readable storage media;

a processing system operatively coupled with the one or more computer readable storage media; and program instructions stored on the one or more computer readable storage media that, when read and executed by the processing system, direct the processing system to:

implement a north/south packet handler of the logical router;

in the north/south packet handler, receive first network traffic from an east/west packet handler of the logical router, wherein the first network traffic is multicast network traffic, and wherein the logical router is a first hop router for the first network traffic from a source of the first network traffic;

identify an entry for the source in unicast routing information for unicast network traffic that is directed to the source from the east/west packet handler, wherein identification of the entry indicates that the first network traffic passes a reverse path forwarding (RPF) check; and in response to the first network traffic passing the RPF check, transfer the first network traffic from the north/south packet handler to a next hop for the first network traffic indicated by first multicast routing information.

11. The apparatus of claim 10, wherein the first multicast routing information indicates that multicast network traffic from the source should be received over an interface with the east/west packet handler, and the program instructions further direct the processing system to:

before transferring the first network traffic, determine that the first network traffic was received by the north/south packet handler from the east/west packet handler in accordance with the first multicast routing information.

12. The apparatus of claim 10, wherein the program instructions further direct the processing system to:

in the north/south packet handler, receive second network traffic directed to the source, wherein the second network traffic is unicast network traffic; and pass the second network traffic to the east/west packet handler, wherein the east/west packet handler routes the second network traffic to the source based on the unicast routing information.

13. The apparatus of claim 10, wherein the unicast routing information and the first multicast routing information are used in a virtual routing and forwarding (VRF) instance on the north/south packet handler.

14. The apparatus of claim 10, wherein the east/west packet handler receives the first network traffic from the source.

15. The apparatus of claim 10, wherein the east/west packet handler transfers the first network traffic to the north/south packet handler based on second multicast routing information that indicates that multicast network traffic from the source should be received over an interface with the source.

16. The apparatus of claim 10, wherein a Protocol-Independent Multicast (PIM) protocol is used for the first network traffic.

17. The apparatus of claim 10, wherein the source comprises a virtual machine.

18. The apparatus of claim 10, wherein the east/west packet handler comprises a distributed router and the north/south packet handler comprises a service router.

19. One or more non-transitory computer readable storage media having program instructions stored thereon for multicast routing from a logical router, the program instructions, when read and executed by a processing system, direct the processing system to:

in a north/south packet handler of the logical router, receive first network traffic from an east/west packet handler of the logical router, wherein the first network traffic is multicast network traffic, and wherein the logical router is a first hop router for the first network traffic from a source of the first network traffic;

identify an entry for the source in unicast routing information for unicast network traffic that is directed to the source from the east/west packet handler, wherein identification of the entry indicates that the first network traffic passes a reverse path forwarding (RPF) check; and in response to the first network traffic passing the RPF check, transfer the first network traffic from the north/ south packet handler to a next hop for the first network traffic indicated by first multicast routing information.

20. The one or more non-transitory computer readable storage media of claim 19, wherein the first multicast routing information indicates that multicast network traffic from the source should be received over an interface with the east/west packet handler, and the program instructions further direct the processing system to:

before transferring the first network traffic, determine that the first network traffic was received by the north/south packet handler from the east/west packet handler in accordance with the first multicast routing information.

\* \* \* \* \*